Sept. 6, 1966 G. MARTENS 3,271,566
ADDING SYSTEM FOR BINARY CODED EXCESS THREE NUMBERS
Filed Sept. 18, 1962
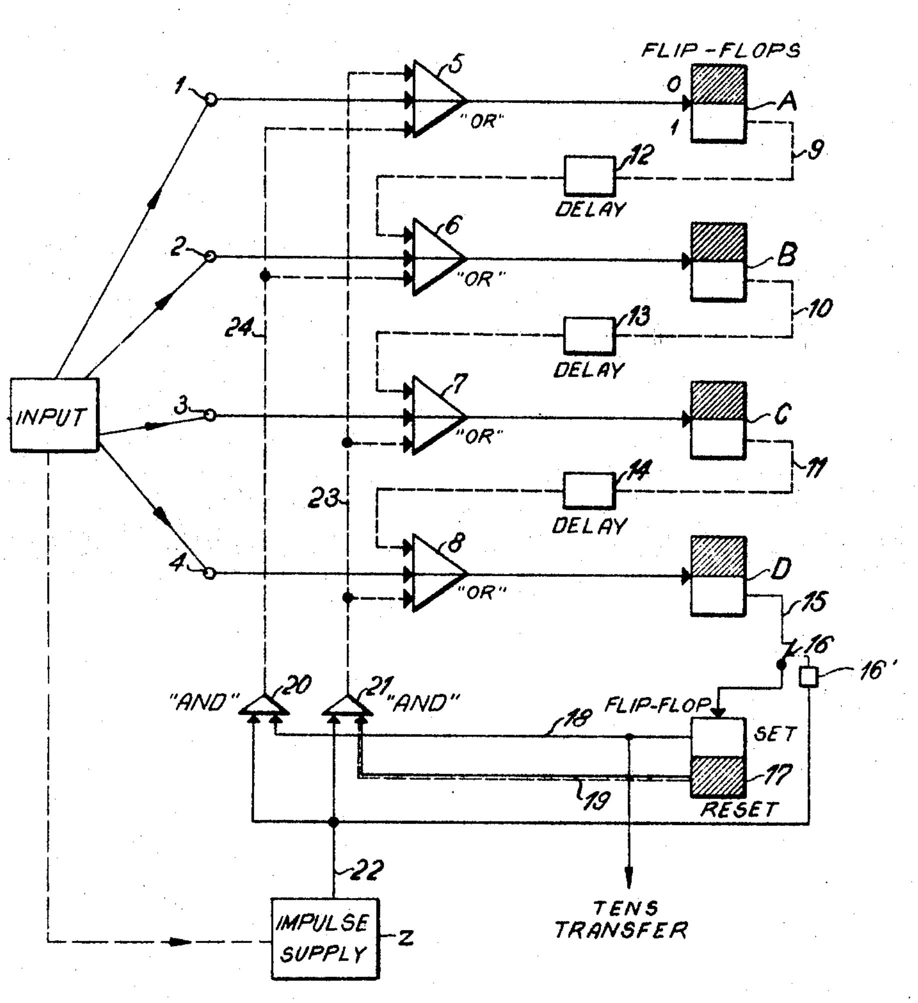
INVENTOR
Günter Martens
by Michael S. Striker
Attorney United States Patent Office 3,271,566

Patented Sept. 6, 1966

3,271,566
ADDING SYSTEM FOR BINARY CODED EXCESS THREE NUMBERS

Günter Martens, Schliersee, Upper Bavaria, Germany, assignor to Kienzle Apparate G.m.b.H., Villingen, Black Forest, Germany Filed Sept. 18, 1962, Ser. No. 224,431
Claims priority, application Germany, Sept. 18, 1961, K 44,737
10 Claims. (Cl. 235—174)

This invention concerns a method and an arrangement for parallel adding multi-digit binary coded numbers representing one-digit decimal numbers.

For carrying out such additions it was necessary up to now to provide for each binary digit position two half-adders, or one normal adder and a correction circuit associated therewith. In known arrangements of this type it was in many cases inconvenient that the signals representing the two operands, e.g. an augend and an addend, had to be available at two inputs at the same time. In addition, such known arrangements were comparatively involved and had no storing capacity so that they could be used only for the actual calculation and the result had to be transmitted to a separate storage arrangement.

It is one object of the present invention to provide for a method and an arrangement for carrying out the above mentioned operation without the disadvantages typical of the known arrangements and methods.

It is another object of this invention to provide for a method and an arrangement according to which multi-digit binary coded numbers are added in parallel and at the same time stored, one operand being introduced after the other.

It is another object of this invention to provide for a method and an arrangement of the type set forth in which the first obtained addition result including necessary transfers is automatically corrected in accordance with the requirements of the particular code and thereafter the final correct result is stored.

The invention includes a method of parallel adding multi-digit binary coded numbers representing one-digit decimal numbers by means of an electric storage arrangement having a plurality of bistable stages respectively assigned to the binary digit positions of multi-digit binary numbers. In the first step a first multi-digit binary number representing a first decimal digit is introduced into the storage by applying to the stages in parallel electric impulses respectively representing binary digits of said first binary number so as to store the respective binary digits of said first number in said stages, respectively. In a second step a second multi-digit binary number representing a second decimal digit is introduced into the storage by applying to the stages in parallel electric impulses respectively representing binary digits of said second binary number so as to change the storage condition of said stages in such a manner that the changed storage condition represents the arithmetic sum of said first and second binary number. Whenever as a result from the formation of such sum in at least one of the stages a binary transfer appears, this binary transfer is transmitted from the particular stage to the stage assigned to a digit position of next higher significance so as to form and store in the latter the arithmetic sum of said binary transfer and of the binary digit previously stored therein. Finally, into said storage electrical impulses representing a corrective multi-digit binary number are introduced depending upon the value of the binary sum stored after said first sum formation and after said transfer transmission, if any, so as to obtain a storage of a final binary sum of said corrective binary number and the previously stored binary sum, the final binary sum thus stored representing the arithmetic sum of said decimal digits represented by said first and second binary numbers. The invention further includes an arrangement for parallel adding multi-digit binary coded numbers representing one-digit decimal numbers, comprising, in combination, electronic storage means including a series of bistable stages respectively assigned to the binary digit positions of multi-digit numbers according to a selected binary code; a plurality of input means respectively associated with said bistable stages for applying in parallel to said bistable stages, respectively, electrical input pulses respectively representing binary digits of multi-digit binary numbers respectively representing the decimal numbers to be added; a plurality of binary carry transmitting means respectively arranged between at least one of said bistable stages and the input means of the bistable stage assigned to a binary digit position of respectively next higher significance for applying a transfer representing pulse thereto, and including delay means for delaying for a predetermined time period the carry transmission after such carry appears in said one bistable stage; correction means arranged between a selected bistable stage being assigned to the highest binary digit position and said plurality of input means and applying, when actuated, electrical correction impulses representing one of two predetermined binary correction numbers to selected ones of said input means, depending upon the storage condition of said selected bistable stage after at least one binary number has been introduced into said storage means by application of said input pulses; and means for actuating said correction means after at least one binary number has been introduced into said storage means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which a schematic circuit diagram of an arrangement according to the invention is illustrated, this illustration serving also to illustrate the method according to the invention.

The drawing illustrates an adding arrangement for adding one-digit decimal numbers represented by multi-digit binary numbers in accordance with a nexcess-three code. For the sake of clarity the diagram has been prepared in block form omitting all those elements which are not required for understanding the invention.

The following chart illustrates the representation of one-digit decimal numbers by four-bit binary numbers in accordance with an excess-three code.

| Decimal Number | Excess-Three Code Representation |
|---|---|
| 0 | 0 0 1 1 |
| 1 | 0 1 0 0 |
| 2 | 0 1 0 1 |
| 3 | 0 1 1 0 |
| 4 | 0 1 1 1 |
| 5 | 1 0 0 0 |
| 6 | 1 0 0 1 |
| 7 | 1 0 1 0 |
| 8 | 1 0 1 1 |
| 9 | 1 1 0 0 |

The decimal numbers in the left column are respectively represented by the four-bit binary coded numbers in the right column. Different from an ordinary binary code, each decimal digit $n$ is represented by the four-bit binary equivalent of $n+3$ according to the ordinary code as is well known in the art.

The excess-three code has been selected because it has the advantageous characteristic that all four binary digits can never be either 0 or 1. This characteristic of this code is very advantageous in the art of electronic calculating machines because it facilitates the detection of any errors of the calculating machine.

A second advantage of this code is the simplicity with which complements can be formed. For instance, the nine-complement of a number as required for carrying out a subtraction by means of complement addition can be formed very simply by exchanging the individual 0 digits against 1 digits, and vice versa which is conventionally called in the art a black-white-exchange of the number representation.

However, it has to be borne in mind that the processing of binary coded decimal numbers requires a correction after each partial addition in which two numbers are operationally combined with each other. Therefore, in the case of using an excess-three code after each partial operation resulting in an intermediate result equal to or larger than "10" a correcting number must be added thereto which represents in accordance with the excess-three code the value "0," namely 0 0 1 1. In the case of an intermediate result smaller than the value "10" a correcting number representing the value "10" in accordance with the excess-three code namely 1 1 0 1 must be added.

The above will be best understood by considering the following examples:

| Decimal Number | Excess-Three Code Representation |
|---|---|
| 0 | 0 0 1 1 |
| 1 | 0 1 0 0 |
| 2 | 0 1 0 1 |
| 3 | 0 1 1 0 |
| 4 | 0 1 1 1 |
| 5 | 1 0 0 0 |
| 6 | 1 0 0 1 |
| 7 | 1 0 1 0 |
| 8 | 1 0 1 1 |
| 9 | 1 1 0 0 |

Example No. 1:

$3+4=7$

| | | |
|---|---|---|
| | 3 = 0 1 1 0 | |
| | + 4 = 0 1 1 1 | |
| no transfer | 1 1 0 1 | Intermediate result |
| | + 10 = 1 1 0 1 | Correction |
| | = 7 = 1 0 1 0 | Final result |

Example No. 2:

$4+6=10$

| | | |
|---|---|---|
| | 4 = 0 1 1 1 | |
| | + 6 = 1 0 0 1 | |
| (Transfer needed) | 0 0 0 0 | Intermediate result |
| | + 0 = 0 0 1 1 | Correction |
| | = 10 = 0 0 1 1 | Final result |

Transfer "1" to next higher decade

Now it will be shown how additions like the one illustrated above including the automatic processing of the binary transfers and the automatic correction may be carried out by the arrangement illustrated in the drawing.

The illustrated adding arrangement is provided with four inputs 1, 2, 3 and 4. From there input lines are taken through "OR" circuits 5–8, respectively, to flip-flops A–D, respectively. In these flip-flops shown in block form the condition "0" is represented by a cross-hatched area, and the condition "1" is represented by a blank area. For transmitting binary transfers that may appear as will be described below in the flip-flops A–C connection lines 9—11, respectively, are provided which include delay circuits 12–14, respectively, whereby such transfers are applied to the "OR" circuits 6–8, respectively, i.e. in each case to the input of the bistable stage being assigned to a binary digit position of respectively next higher significance. The delay circuits 12–14 are provided on account of the characteristics of the bistable elements and for preventing the simultaneous occurrence of an input impulse and of a transfer impulse at the input of one of the flip-flops. If this would occur a wrong result would be obtained because one control impulse would be lost for the particular flip-flop so that the latter would assume a wrong or incorrect storage condition. In addition the delay circuits 12–14 have the effect that upon each application of digit-representing impulses to the flip-flops A–C occurring transfers can be transmitted step-by-step from the bistable stage A assigned to a binary digit position of lowest significance up to the stage D assigned to a binary digit position of relatively highest significance.

For the purpose of carrying out the required corrections a further flip-flop 17 is provided to which transfers from the stage D are transmitted via a line 15 including a relay switch 16. Output lines 18 and 19 of the flip-flop 17 are taken to "AND" circuits 20 and 21, respectively. The second inputs of the two "AND" circuits are connected by line 22 with an impulse supply Z. The output lines of the "AND" circuits 20 and 21 are connected by lines 24 and 23, respectively with selected groups of the "OR" circuits 5–8 as will be described further below. The line 22 is also connected with the solenoid 16' of the relay switch 16 so that an impulse introduced by line 22 also controls the relay switch 16 by moving it to open position so that a decimal transfer from the flip-flop D appearing with the introduction of a correction number will not again change the momentary condition of the flip-flop 17. The condition of the flip-flop 17 must depend only upon the result of processing the two one-digit decimal numbers to be added because as mentioned further below, the condition of the flip-flop 17 also determines a transfer to the next higher decimal order position.

The calculations in accordance with the above given examples are carried out in the arrangement as follows.

Before introducing one operand the adding arrangement according to the invention may be placed in the condition 0 0 0 0. This can be effected by closing, before the introduction of the first operand, an electric contact whereby an impulse is applied via lines not illustrated to each of the flip-flops A–D and 17 in such a manner that all these flip-flops assume "0" condition illustrated by the cross-hatch areas as shown. Now the first operand is introduced. This may be done in various ways not forming part of this invention. For instance, a number key of a contact keyboard not shown and associated with the decimal digits "0–9" may be depressed so as to close a corresponding circuit. The contact keyboard may be connected with a conventional coding device not shown. This coding device may be for example a diode matrix having ten inputs and four outputs. When by the actuation of a key a circuit for one of the ten inputs of the coding device is closed, a four-bit binary number representing the decimal digit associated with the particular key is introduced into the arrangement in the form of input impulses to those input lines 1–4 which in accordance with the particular code are assigned to a binary digit "1."

In accordance with the above given Example No. 1 the first decimal digit "3" is introduced by applying impulses to the input lines 2 and 3 whereby the flip-flops B and C are changed to the condition "1" represented by the above mentioned blank area. Now, when the key associated with the decimal value "4" is actuated input impulses are applied in the same manner as above to the input lines 1–3 whereby the condition of the flip-flops A–C is changed. The flip-flop A is changed from condition "0" to condition "1," the flip-flop B is returned from condition "1" to condition "0" and this change from condition "1" to condition "0" results in a binary transfer impulse which is released through line 10. Also the flip-flop C is returned from the condition "1" to the condition "0"

and furnishes for the same reason a binary transfer impulse through line 11. These binary transfer impulses, after a predetermined delay, return the flip-flop C again to "1" condition and the flip-flop D to "1" condition. No transfer impulse has been applied from the flip-flop D via line 15 to the flip-flop 17 so that the latter remains in the reset condition illustrated by the cross-hatch area thereof.

An impulse generator Z is provided which is actuated together with the introduciton of each decimal digit into the adding arrangement in such a manner that after receiving two actuating impulses or after the introduction of two decimal digits an output impulse with predetermined delay is applied through line 22 to the above described correcting arrangement. This output impulse is applied to one input of the "AND" circuit 21 which in the case of the present example, is also supplied with current by the flip-flop 17 via line 19 so that now a correction impulse is delivered via line 23 to the "OR" circuits 5, 7 and 8. Consequently each of the flip-flops A, C and D is supplied with a control impulse which action is equivalent to the introduction of a binary correction number 1 1 0 1 representing "10." However the output pulse through line 22 is also applied to the solenoid 16' whereby the relay switch 16 is moved to open position so that transfers from the flip-flop D cannot act on the flip-flop 17 during the correction step. By the introduction of the correction number the previous condition or storage 1 1 0 1 of the flip-flops A–D is changed by the addition of the number 1 1 0 1 from storing 1 1 0 1 to 1 0 1 0 which represents the final result of the addition, namely the decimal value "7."

The processing of Example No. 2 is analogous and may be described more briefly. The addition of the binary numbers 0 1 1 1 and 1 0 0 1 causes a transfer from the flip-flop D whereby the flip-flop 17 is changed to its set condition represented by the blank area thereof. Consequently the subsequent application of the output impulse from the generator Z finds the "AND" circuit 21 blocked and the "AND" circuit 20 conductive. Thus the output pulse of the circuit 20 is applied via line 24 to the "OR" circuits 5 and 6 so that correspondingly the flip-flops A and B are changed to their second condition. This means that to the stored number 0 0 0 0 the correction number 0 0 1 1 is added whereafter the final result 0 0 1 1 is stored which corresponds to the decimal digit "0."

In the result of the decimal addition "4+6=10" and "0" appears in the lowest order decade. Therefore the final condition of the flip-flop 17 must be additionally used for causing in the course of a subsequent addition of decimal digits in the next higher decimal order position the addition of a decimal transfer "1" (tens+transfer).

In many cases it may not be possible to start the operation with a condition 0 0 0 0 of the flip-flops A–D. In this case the starting condition to be used is 0 0 1 1 which can be effected in a similar manner as above by actuating a 0-key of the keyboard. In this case the 0-key would be connected by corresponding lines with the flip-flops A–D and 17 whereby the flip-flops A and B will be placed into condition "1" while the remaining flip-flops are placed into the condition represented by the cross-hatch areas thereof. It has to be borne in mind that under these circumstances, namely in the case of starting the operation of the adding arrangement with a starting conidtion 0 0 1 1 corresponding in terms of the above mentioned code to the decimal number "0," a correction is to be carried out after the introduction of each individual binary number that is, one correction after the introduction of each operand. Thus, in this case the impulse generator Z which actuates the correction arrangement must be so constructed that it delivers after the introduction of each operand one impulse applied to the line 22.

It will be understood that for further processing the binary numbers stored in the flip-flops or bistable stages A–D conventional output means may be connected with these stages.

It shoud be further understood that the arrangement described above is as suitable for carrying out subtractions as it is for additions. As hereinbefore mentioned, subtraction can be carried out by addition of complement values in a well known manner. In such case the binary number representing in accordance with the selected code the subtrahend is to be introduced into the adding arrangement after applying to it the above defined black-white-exchange. For instance, the decimal number "4" is represented in the case of addition by 0 1 1 1, however in the case of subtraction by 1 0 0 0. This conversion of binary digits can be effected in a well known manner by corresponding elements of the coding device whenever subtraction is desired.

For the purpose of explanation the above description is based on the use of an excess-three code. It should be noted that by suitable modification of the above described adding arrangement, particularly by changing the connection of the lines 23 and 24 with selected groups of the "OR" circuits 5–8, the arrangement can be adapted easily for carrying out calculations on the basis of other codes. The actual nature of the correction number depends in all cases only upon the characteristic of the selected code and upon the question as to whether a decimal transfer, e.g. from the flip-flop D is carried out or not.

It will be understood that each of the elements described above, or two or more together, may also find a useful application in other types of a method and arrangement for parallel adding multi-digit binary coded numbers differing from the types described above.

While the invention has been illustrated and described as embodied in a method and arrangement for parallel adding multi-digit binary coded numbers representing one-digit decimal numbers, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An arrangement for parallel adding multi-digit binary coded numbers representing one-digit decimal numbers in terms of an excess-three code, comprising, in combination, electronic storage means including a series of bistable stages respectively assigned to the binary digit positions of multi-digit numbers according to an excess-three binary code; a plurality of input means respectively associated with said bistable stages for applying sequentially in parallel to said bistable stages, respectively, electrical input pulses respectively representing binary digits of multi-digit binary numbers respectively representing the decimal numbers to be added, each of said input means comprising an "OR" circuit means having three inputs for receiving input, carry and correction impulses, respectively, and one output connected to the input of the respectively associated bistable stage; a plurality of binary carry transmitting means respectively arranged between each of said bistable stages and the input means of the bistable stage assigned to a binary digit position of respectively next higher significance for applying a transfer representing pulse thereto, and including delay means for delaying for a predetermined time period the carry transmission after such carry appears in the respective bistable stage; correction means arranged between a selected bistable stage being assigned to the highest binary digit position and said plurality of input means and applying, when actuated, to selected ones of said input means electrical correction impulses representing a first predetermined binary correction number, if no carry appears, and a second predetermined binary correction number if a carry appears at said selected bistable stage after two binary numbers have been introduced into said storage means by application of said input pulses; and actuating means for actuating said correction means after two binary numbers have been introduced into said storage means, said actuating means including switch means for disconnecting said correction means from said selected bistable stage when said correction means are actuated.

2. An arrangement for parallel adding multi-digit binary coded numbers representing one-digit decimal numbers in terms of an excess-three code comprising, in combination, electronic storage means including a series of flip-flop stages respectively assigned to the binary digit positions of multi-digit numbers according to an excess-three binary code; a plurality of input means respectively associated with said flip-flop stages for applying sequentially in parallel to said flip-flop stages, respectively, electrical input pulses respectively representing binary digits of multi-digit binary numbers respectively representing the decimal numbers to be added, each of said input means comprising an "OR" circuit means having three inputs for receiving input, carry and correction impulses, respectively, and one output connected to the input of the respectively associated flip-flop stage; a plurality of binary carry transmitting means respectively arranged between each of said flip-flop stages and the respective input means of that of the flip-flop stages which is assigned to a binary digit position of respectively next higher significance for applying a transfer representing pulse thereto, and including delay means for delaying for a predetermined time period the carry transmission after such carry appears in the respective one of said flip-flop stages; correction means arranged between a selected flip-flop stage being assigned to the highest binary digit position and said plurality of input means and applying, when actuated to selected ones of said input means electrical correction impulses representing a first predetermined binary correction number when the algebraic sum of said one-digit decimal numbers is less than 10, and a second predetermined binary correction number when the algebraic sum of said one-digit decimal numbers is at least 10 after two binary numbers have been introduced into said storage means by application of said input pulses; and actuating means for actuating said correction means after two binary numbers have been introduced into said storage means, said actuating means including switch means for disconnecting said correction means from said selected flip-flop stage when said correction means are actuated.

3. An arrangement for parallel adding multi-digit binary coded numbers representing one-digit decimal numbers in terms of an excess-three code, comprising, in combination, electronic storage means including a series of flip-flop stages respectively assigned to the binary digit positions of multi-digit numbers according to an excess-three binary code; a plurality of input means respectively associated with said flip-flop stages for applying sequentially in parallel to said flip-flop stages, respectively, electrical input pulses respectively representing binary digits of multi-digit binary numbers respectively representing the decimal numbers to be added, each of said input means comprising an "OR" circuit means having three inputs for receiving input, carry and correction impulses, respectively, and one output connected to the input of the respectively associated flip-flop stage; a plurality of binary carry transmitting means respectively arranged between each of said flip-flop stages and the respective input means of that of the flip-flop stages which is assigned to a binary digit position of respectively next higher significance for applying a transfer respresenting pulse thereto, and including delay means for delaying for a predetermined time period the carry transmission after such carry appears in the respective one of said flip-flop stages and for causing the application of a carry representing pulse to the respective input means only subsequent to the application of an input pulse thereto; correction means arranged between a selected flip-flop stage being assigned to the highest binary digit position and said plurality of input means and applying, when actuated, to selected ones of said input means electrical correction impulses representing a first predetermined binary correction number, when the algebraic sum of said one-digit decimal number is less than 10, and a second predetermined binary correction number when the algebraic sum of said one-digit decimal numbers is at least 10 after two binary numbers have been introduced into said storage means by application of said input pulses; and actuating means for actuating said correction means after two binary numbers have been introduced into said storage means, said actuating means including switch means for disconnecting said correction means from said selected flip-flop stage when said correction means are actuated.

4. An arrangement for parallel adding multi-digit binary coded numbers representing one-digit decimal numbers in terms of an excess-three code, comprising, in combination, electronic storage means including a series of flip-flop stages respectively assigned to the binary digit positions of multi-digit numbers according to an excess-three binary code; a plurality of input means respectively associated with said flip-flop stages for applying sequentially in parallel to said flip-flop stages, respectively, electrical input pulses respectively representing binary digits of multi-digit binary numbers respectively representing the decimal numbers to be added, each of said input means comprising an "OR" circuit means having three inputs for receiving input, carry and correction impulses, respectively, and one output connected to the input of the respectively associated flip-flop stage; a plurality of binary carry transmitting means respectively arranged between each of said flip-flop stages and the respective input means of that of the flip-flop stages which is assigned to a binary digit position of respectively next higher significance for applying a transfer representing pulse thereto, and including delay means for delaying for a predetermined time period the carry transmission after such carry appears in the respective one of said flip-flop stages; correction means including flip-flop means arranged between a selected flip-flop stage being assigned to the highest binary digit position and said plurality of input means and changeable between alternative conditions by carry pulses from said selected flip-flop stage, said correction means applying, when actuated, to selected ones of said input means electrical correction impulses representing a first predetermined binary correction number when the algebraic sum of said one-digit decimal number is less than 10, and a second predetermined binary correction number when the algebraic sum of said one-digit decimal numbers is at least 10 after two binary numbers have been introduced into said storage means by application of said input pulses; and actuating means for actuating said correction means after two binary numbers have been introduced into said storage means, said actuating means including switch means for disconnecting said correction means from said selected flip-flop stage when said correction means are actuated.

5. An arrangement for parallel adding multi-digit binary coded numbers representing one-digit decimal numbers in terms of an excess-three code, comprising, in combination, electronic storage means including a series of flip-flop stages respectively assigned to the binary digit positions of multi-digit numbers according to an excess-three binary code; a plurality of input means respectively associated with said flip-flop stages for applying sequentially in parallel to said flip-flop stages, respectively, electrical input pulses respectively representing binary digits of multi-digit binary numbers respectively representing the decimal numbers to be added, each of said input means comprising an "OR" circuit means having three inputs for receiving input, carry and correction impulses, respectively, and one output connected to the input of the respectively associated flip-flop stage; a plurality of binary carry transmitting means respectively arranged between each of said flip-flop stages and the respective input means of that of the flip-flop stages which is assigned to a binary digit position of respectively next higher significance for applying a transfer respesenting pulse thereto, and including delay means for delaying for a predetermined time period the carry transmission after such carry appears in the respective one of said flip-flop stages; correction means including flip-flop means arranged between a selected flip-flop stage being assigned to the highest binary digit position and said plurality of input means and changeable between alternative conditions by carry pulses from said selected flip-flop stage, said correction means applying when actuated by an actuating impulse, to selected ones of said input means electrical correction impulses representing a first predetermined binary correction number when the algebraic sum of said one-digit decimal numbers is less than 10, and a second predetermined binary correction number when the algebraic sum of said one-digit decimal numbers is at least 10 two binary numbers have been introduced into said storage means by application of said input pulses; and actuating means including impulse generator means for applying an actuating impulse to said correction means after two binary numbers have been introduced into said storage means, said actuating means including switch means for disconnecting said correction means from said selected flip-flop stage when said correction means are actuated.

6. An arrangement for parallel adding multi-digit binary coded numbers representing one-digit decimal numbers in terms of an excess-three code, comprising, in combination, electronic storage means including four bistable stages respectively assigned to the binary digit positions of four-digit binary numbers according to an excess-three binary code; a plurality of input means respectively associated with said bistable stages for applying sequentially in parallel to said bistable stages, respectively, electrical input pulses respectively representing binary digits of multi-digit binary numbers respectively representing the decimal numbers to be added, each of said input means comprising an "OR" circuit means having three inputs for receiving input, carry and correction impulses, respectively, and one output connected to the input of the respectively associated bistable stage; a plurality of binary carry transmitting means respectively arranged between each of said bistable stages and the input means of the bistable stage assigned to a binary digit position of respectively next higher significance for applying a transfer representing pulse thereto, and including delay means for delaying for a predetermined time period the carry transmission after such carry appears in the respective bistable stage; correction means arranged between a selected bistable stage being assigned to the highest binary digit position and said plurality of input means and applying, when actuated, to selected ones of said input means electrical correction impulses representing a first predetermined binary correction number when the algebraic sum of said one-digit decimal numbers is less than 10, and a second predetermined binary correction number when the algebraic sum of said one-digit decimal numbers is at least 10 after two binary numbers have been introduced into said storage means by application of said input pulses; and actuating means for actuating said correction means after two binary numbers have been introduced into said storage means, said actuating means including switch means for disconnecting said correction means from said selected bistable stage when said correction means are actuated.

7. An arrangement according to claim 6, wherein said switch means is a relay switch means connected with said impulse generator means for being energized by said actuating impulses.

8. An arrangement for parallel adding multi-digit binary coded numbers representing one-digit decimal numbers in terms of an excess-three code, comprising, in combination, electronic storage means including four flip-flop stages respectively assigned to the binary digit positions of four-digit binary numbers according to an excess-three binary code; a plurality of input means respectively associated with said flip-flop stages for applying sequentially in parallel to said flip-flop stages, respectively, electrical input pulses respectively representing binary digits of multi-digit binary numbers respectively representing the decimal numbers to be added, each of said input means comprising an "OR" circuit means having three inputs for receiving input, carry and correction impulses, respectively, and one output connected to the input of the respectively associated flip-flop stage; a plurality of binary carry transmitting means respectively arranged between each of said flip-flop stages and the respective input means of the flip-flop stages assigned to a binary digit position of respectively next higher significance for applying a transfer representing pulse thereto, and including delay means for delaying for a predetermined time period the carry transmission after such carry appears in the respective one of said group of flip-flop stages; correction means including flip-flop means arranged between a selected flip-flop stage being assigned to the highest binary digit position and said plurality of input means and changeable between alternative conditions by carry pulses from said selected flip-flop stage, said correction means applying, when actuated by an actuating impulse, to selected ones of said input means electrical correction impulses representing a first predetermined binary correction number when the algebraic sum of said one-digit decimal numbers is less than 10, and a second predetermined binary correction number when the algebraic sum of said one-digit decimal numbers is at least 10 after two binary numbers have been introduced into said storage means by application of said input pulses; and actuating means including impulse generator means for applying an actuating impulse to said correction means after two binary numbers have been introduced into said storage means, said actuating means including switch means for disconnecting said correction means from said selected flip-flop stage when said correction means are actuated.

9. An arrangement for parallel adding multi-digit binary coded numbers representing one-digit decimal numbers in terms of an excess-three code, comprising, in combination, electronic storage means including a series of flip-flop stages respectively assigned to the binary digit positions of multi-digit numbers according to an excess-three binary code; a plurality of input means respectively associated with said flip-flop stages for applying sequentially in parallel to said flip-flop stages, respectively, electrical input pulses respectively representing binary digits of multi-digit binary numbers respectively representing the decimal numbers to be added, each of said input means comprising an "OR" circuit means having three inputs for receiving input, carry and correction impulses, respectively, and one output connected to the input of the respectively associated flip-flop stage; a plurality of binary carry transmitting means respectively arranged between each of said flip-flop stages and the respective input means of the flip-flop stages assigned to a binary digit position of respectively next higher significance for applying a transfer representing pulse thereto, and including delay means for delaying for a predetermined time period the carry transmission after such carry appears in the respective one of said group of flip-flop stages; correction means including flip-flop means arranged between a selected flip-flop stage being assigned to the highest binary digit position and said plurality of input means and changeable between alternative conditions by carry pulses from said selected flip-flop stage, said correction means applying, when actuated by an actuating impulse, to selected ones of said input means electrical correction impulses representing a first predetermined binary correction number when the algebraic sum of said one-digit decimal numbers is less than 10, and a second predetermined binary correction number when the algebraic sum of said one-digit decimal numbers is at least 10 after two binary numbers have been introduced into said storage means by application of said input pulses; and actuating means including impulse generator means for applying an actuating impulse to said correction means after two binary numbers have been introduced into said storage means, said actuating means including switch means for disconnecting said correction means from said selected flip-flop stage when said correction means are actuated.

10. An arrangement for parallel adding multi-digit binary coded numbers representing one-digit decimal numbers in terms of an excess-three code, comprising, in combination, electronic storage means including a series of flip-flop stages respectively assigned to the binary digit positions of multi-digit numbers according to an excess-three binary code, each of said bistable stages having an input and an output; a plurality of input means respectively associated with said flip-flop stages for applying sequentially in parallel to said flip-flop stages, respectively, electrical input pulses respectively representing binary digits of multi-digit binary numbers respectively representing the decimal numbers to be added; a plurality of binary carry transmitting means respectively arranged between each of said flip-flop stages and the respective input means of that of the flip-flop stages which is assigned to a binary digit position of respectively next higher significance for applying a transfer representing pulse thereto, and including delay means for delaying for a predetermined time period the carry transmission after such carry appears in the respective one of said flip-flop stages, each of said delay means being connected in series circuit arrangement with the input means of the bistable stage assigned to a binary digit position of next higher significance in a manner whereby each of said series circuit arrangements is directly connected between the output of the corresponding one of said bistable stages and the input of the bistable stage assigned to a binary digit position of next higher significance and said bistable stages are connected in series with each other by the corresponding series circuit arrangements; correction means including flip-flop means arranged between a selected flip-flop stage being assigned to the highest binary digit position and said plurality of input means and changeable between alternative conditions by carry pulses from said selected flip-flop stage, said correction means applying, when actuated by an actuating impulse, to selected ones of said input means electrical correction impulses representing a first predetermined binary correction number when the algebraic sum of said one-digit decimal number is less than 10, and a second predetermined binary correction number when the algebraic sum of said one-digit decimal numbers is at least 10 after two binary numbers have been introduced into said storage means by application of said input pulses, said correction means also including at least two "AND" circuit means connected between the outputs of said flip-flop means, said plurality of input means and said impulse generator means, one of said "AND" circuit means applying said electrical correction impulses to a first selected group of said input means upon coincidence of one of said actuating impulses with a first condition of said flip-flop means, the other "AND" circuit means applying said electrical correction impulses to a second selected group of said input means upon coincidence of one of said actuating impulses with a second condition of said flip-flop means; and actuating means including impulse generator means for applying an actuating impulse to said correction means after two binary numbers have been introduced into said storage means, said actuating means including switch means for disconnecting said correction means from said selected flip-flop stage when said correction means are actuated.

References Cited by the Examiner

UNITED STATES PATENTS

| | | | |
|---|---|---|---|
| 2,705,108 | 3/1955 | Stone | 235—169 |
| 2,886,241 | 5/1959 | Spaulding et al. | |

ROBERT C. BAILEY, *Primary Examiner.*

MALCOLM A. MORRISON, *Examiner.*

E. RONEY, M. LISS, *Assistant Examiners.*